(12) United States Patent
Shimizu et al.

(10) Patent No.: US 8,722,780 B2
(45) Date of Patent: May 13, 2014

(54) PERFLUOROELASTOMER COMPOSITION AND MOLDED ARTICLE HEREOF

(75) Inventors: Tomoya Shimizu, Shizuoka (JP); Naoya Kuzawa, Shizuoka (JP); Takeshi Kuboyama, Shizuoka (JP); Hideyuki Shishitani, Shizuoka (JP)

(73) Assignee: Nichias Corporation, Tokyo (JP)

( * ) Notice: Subject to any disclaimer, the term of this patent is extended or adjusted under 35 U.S.C. 154(b) by 1065 days.

(21) Appl. No.: 12/393,401

(22) Filed: Feb. 26, 2009

(65) Prior Publication Data

US 2009/0221758 A1    Sep. 3, 2009

(30) Foreign Application Priority Data

Feb. 28, 2008 (JP) ................ P.2008-047521

(51) Int. Cl.
*C08K 5/092* (2006.01)
*C08F 14/26* (2006.01)

(52) U.S. Cl.
USPC ............. 524/321; 524/92; 524/544; 524/545; 524/546; 526/247; 526/248; 526/250; 526/255; 525/326.3

(58) Field of Classification Search
USPC ................. 524/92, 321; 526/248; 525/326.2
See application file for complete search history.

(56) References Cited

U.S. PATENT DOCUMENTS 3,919,143 A * 11/1975 Morris ............... 525/328.6
6,794,457 B2 * 9/2004 Grootaert et al. ......... 525/326.3

FOREIGN PATENT DOCUMENTS

| EP | 0 989 146 A1 | 3/2000 |
| JP | 3-3708 | 1/1991 |
| JP | 2000-95831 | 4/2000 |
| JP | 2004-500459 | 1/2004 |
| JP | 2004-533507 | 11/2004 |
| JP | 2005-506391 | 3/2005 |

* cited by examiner

*Primary Examiner* — Nicole M Buie-Hatcher
(74) *Attorney, Agent, or Firm* — Nixon & Vanderhye P.C.

(57) ABSTRACT

The present invention provides a perfluoroelastomer composition comprising: a perfluoroelastomer having a nitrogen-containing curing site; and a catalyst mixture comprising: a tertiary amine; and an organic dicarboxylic acid represented by general formula (1) or (2) in an amount of 0.4 to 2 mol per mol of the tertiary amine:

HOOC—COOH    (1)

HOOC-A-COOH    (2)

wherein A in formula (2) is an alkyl group having 1 to 10 carbon atoms or a phenyl group, which may be partially or fully fluorinated. Also disclosed is a perfluoroelastomer molded article obtained from the composition.

2 Claims, No Drawings

PERFLUOROELASTOMER COMPOSITION AND MOLDED ARTICLE HEREOF

FIELD OF THE INVENTION

The present invention relates to a perfluoroelastomer composition and a molded article thereof.

BACKGROUND OF THE INVENTION

Perfluoroelastomers have been widely used in semiconductor producing equipment and the like because of their excellent chemical stability. In particular, perfluoroelastomers having a crosslinking site containing a triazine structure can be suitably used for applications that require heat resistance, such as thermal diffusion furnaces, plasma CVD equipment and plasma etching equipment.

In general, perfluoroelastomers exhibit excellent resistance to chemicals and heat resistance due to stability and inertness of a copolymerized perfluorinated monomer unit constituting a main portion of the polymer main chain, and peroxide crosslinking mainly using a peroxide and a co-crosslinking agent is performed.

Further, for example, it has been known that a perfluoroelastomer having a nitrogen-containing curing site such as perfluoro-8-cyanomethyl-3,6-dioxa-1-octene comes to have a crosslinking site containing a triazine structure by trimerization of cyano groups, thereby being excellent in heat stability or chemical stability. As a curing catalyst for this instance, a tin compound (see patent document 1) or a phosphorus compound (see patent document 2) is used.

However, a thermal diffusion process or a plasma CVD process extremely disfavors impurity metals, so that a perfluoroelastomer containing the above-mentioned curing catalyst is not preferred. For such a reason, the use thereof is therefore limited in many cases. Then, in recent years, nitrogen-containing compounds have been more and more used as new curing agents (see patent documents 3 and 4).

Patent Document 1: JP-B-3-3708
Patent Document 2: JP-T-2005-506391
Patent Document 3: JP-T-2004-500459
Patent Document 4: JP-T-2004-533507

SUMMARY OF THE INVENTION

However, since the curing agents described in patent documents 3 and 4 has excessively high activity, crosslinking proceeds during kneading to cause the occurrence of a phenomenon called "scorch" in some cases. Further, when crosslinking conditions such as a crosslinking temperature vary, the crosslinking rate cannot be controlled and crosslinking cannot be attained in some cases.

Accordingly, an object of the invention is to make it possible to realize crosslinking of a perfluoroelastomer having a nitrogen-containing curing site without the occurrence of the scorch, and further to comply with changes in crosslinking conditions.

Other objects and effects of the invention will become apparent from the following description.

In order to achieve the above-mentioned objects, the invention provides the following:

1) A perfluoroelastomer composition comprising:
   a perfluoroelastomer having a nitrogen-containing curing site; and
   a catalyst mixture comprising:
   a tertiary amine; and
   an organic dicarboxylic acid represented by general formula (1) or (2) in an amount of 0.4 to 2 mol per mol of the tertiary amine:

wherein A in formula (2) is an alkyl group having 1 to 10 carbon atoms or a phenyl group, which may be partially or fully fluorinated;

2) The perfluoroelastomer composition described in the above 1), wherein the tertiary amine has a pKa of 9.0 or more; and 3) A perfluoroelastomer molded article obtained by molding and crosslinking the perfluoroelastomer composition described in the above 1) or 2).

Although a tertiary amine is used as a catalyst in the perfluoroelastomer composition of the invention, the occurrence of the scorch can be inhibited by the presence of the organic dicarboxylic acid. Further, the crosslinking rate can be also controlled by the mixing ratio of the tertiary amine and the organic carboxylic acid.

DETAILED DESCRIPTION OF THE INVENTION

The invention will be described in detail below.

The perfluoroelastomer composition of the invention contains a perfluoroelastomer having a nitrogen-containing curing site. The perfluoroelastomers having a nitrogen-containing curing site include, for example, a ternary copolymer of (a) tetrafluoroethylene, (b) a perfluoro($C_1$-$C_5$ alkyl vinyl ether) and/or a perfluoro($C_3$-$C_{11}$ alkoxyalkyl vinyl ether) and (c) a cyano group-containing perfluorovinyl ether.

The perfluoro($C_1$-$C_5$ alkyl vinyl ether) of component (b) as used herein is a perfluoroalkyl vinyl ether in which the alkyl group has 1 to 5 carbon atoms. Specific examples thereof include perfluoromethyl vinyl ether, perfluoroethyl vinyl ether, perfluoropropyl vinyl ether and the like, and more preferably perfluoromethyl vinyl ether. The perfluoro($C_3$-$C_{11}$ alkoxyalkyl vinyl ether) of component (b) is a perfluoroalkoxyalkyl vinyl ether in which the total number of carbon atoms in its side chain-constituting portion is from 3 to 11, i.e., a perfluoroalkoxyalkyl vinyl ether in which the total number of the carbon atoms in the alkoxy group and the alkyl group is from 3 to 11. Specific examples thereof include $CF_2$=$CFOCF_2CF(CF_3)OC_nF_{2n+1}$ (n: 1 to 5), $CF_2$=$CFO(CF_2)_3OC_nF_{2n+1}$ (n: 1 to 5), $CF_2$=$CFOCF_2CF(CF_3)O(CF_2O)_mC_nF_{2n+1}$ (n: 1 to 5, m: 1 to 3), $CF_2$=$CFO(CF_2)_2OC_nF_{2n+1}$ (n: 1 to 5) and the like. These components (b) may be used either alone or as an appropriate combination of two or more thereof.

The cyano group-containing perfluorovinyl ether (c) corresponds to the nitrogen-containing curing site, and includes, for example, $CF_2$=$CFO(CF_2)_nOCF(CF_3)CN$ (n: 2 to 4), $CF_2$=$CFO(CF_2)_nCN$ (n: 2 to 12), $CF_2$=$CFO[CF_2CF(CF_3)O]_m(CF_2)_nCN$ (n: 2, m: 1 to 5), $CF_2$=$CFO[CF_2CF(CF_3)O]_m(CF_2)_nCN$ (n: 1 to 4, m: 1 to 2), $CF_2$=$CFO[CF_2CF(CF_3)O]_nCF_2CF(CF_3)CN$ (n: 0 to 4) and the like. Above all, perfluoro(8-cyano-5-methyl-3,6-dioxa-1-octene) is preferred.

Further, for the blending ratio, tetrafluoroethylene (a) is from 50 to 75 mol % and preferably from 60 to 75 mol %, the perfluoro($C_1$-$C_5$ alkyl vinyl ether) and/or perfluoro($C_3$-$C_{11}$ alkoxyalkyl vinyl ether) (b) is from 49.8 to 25 mol % and preferably from 39.8 to 25 mol %, and the cyano group-containing perfluorovinyl ether (c) is from 0.2 to 5 mol % and preferably from 0.5 to 3 mol %.

Further, the perfluoroelastomer composition of the invention contains a mixture of a tertiary amine and an organic dicarboxylic acid represented by the following general formula (1) or (2) as a catalyst for curing the above-mentioned perfluoroelastomer having a nitrogen-containing curing site.

HOOC—COOH (1)

HOOC-A-COOH (2)

A in formula (2) is an alkyl group having 1 to 10 carbon atoms or a phenyl group, which may be partially or fully fluorinated. Preferably, oxalic acid, adipic acid or perfluorosuberic acid is used.

The tertiary amines include 1,8-diazabicyclo[5,4,0]7-undecene (DBU), 1,5-diazabicyclo[4,3,0]-5-nonene (DBN), 1,4-diazabicyclo[2,2,2]octane (DABCO) and the like. However, preferred is one having a pKa of 9.0 or more, and DBU (pKa: 12.5), DBN (pKa: 12.7) and the like correspond thereto.

For the mixing ratio of the tertiary amine and the organic dicarboxylic acid, the organic dicarboxylic acid is used in an amount of 0.4 to 2 mol, preferably 0.5 to 1.5 mol, per mol of the tertiary amine. When the mixing ratio of the organic dicarboxylic acid is less than 0.4 mol, the scorch is liable to occur. When it exceeds 2 mol, the activity becomes too low, giving a concern of causing insufficient crosslinking. Both are therefore unfavorable.

The catalyst comprising the tertiary amine and the organic dicarboxylic acid is prepared by dissolving a predetermined amount of the organic dicarboxylic acid in a solvent, for example, an alcohol, adding dropwise a predetermined amount of the tertiary amine thereto, and then, removing the alcohol under vacuum.

The catalyst is incorporated preferably in an amount of 0.1 to 10 parts by mass per 100 parts by mass of the perfluoroelastomer.

Further, various additives may be incorporated into the perfluoroelastomer composition of the invention, depending on requirements for applied places. For example, it is possible to incorporate a filler such as carbon black, a stabilizer, a plasticizer, a lubricant, a processing aid and the like.

The perfluoroelastomer composition of the invention is obtained by blending and kneading the perfluoroelastomer having a nitrogen-containing curing site, the catalyst comprising the tertiary amine and the organic dicarboxylic acid, and optionally the additive(s). Incidentally, a general kneading machine for rubber, for example, an open roll, a kneader or the like, can be used for kneading. At this time, the occurrence of the scorch is inhibited by the presence of the organic dicarboxylic acid.

Then, the resulting kneaded product is molded into a predetermined shape, for example, an O-ring or the like, and crosslinked by heating to obtain a perfluoroelastomer molded article of the invention.

EXAMPLES

The present invention will be illustrated in greater detail with reference to the following examples and comparative examples, but the invention should not be construed as being limited thereby.

Preparation of Perfluoroelastomer (FFKM)

A 500-ml stainless steel autoclave was charged with 200 ml of distilled water, 2.5 g of ammonium perfluorooctanoate and 4.4 g of $Na_2HPO_4 \cdot 12H_2O$, and the inside thereof was replaced by nitrogen gas. Then, the pressure was reduced. After cooled to 50° C., this autoclave was charged with 32 g of tetrafluoroethylene, 68 g of perfluoromethyl vinyl ether and 6.4 g of perfluoro-8-cyano-5-methyl-3,6-dioxa-1-octene. After the temperature was increased to 80° C., 0.75 g of sodium sulfite and 3.75 g of ammonium persulfate were each added in the form of 25 ml of an aqueous solution to initiate polymerization. After the polymerization was continued for 20 hours, unreacted gas was purged, and an aqueous latex formed therein was taken out. Salting out was carried out with a 10% aqueous solution of sodium chloride, followed by drying to obtain 44 g of a crumb rubber-form ternary copolymer. From the results of infrared absorption analysis, this ternary copolymer had a copolymerization composition of 62 mol % of tetrafluoroethylene, 37 mol % of perfluoromethyl vinyl ether and 1.0 mol % of perfluoro-8-cyano-5-methyl-3,6-dioxa-1-octene (characteristic absorption of the cyano group: 2,268 $cm^{-1}$).

Preparation of Catalyst

Oxalic acid, adipic acid or perfluorosuberic acid (manufactured by Tokyo Chemical Industry Co., Ltd.) was dissolved in 50 ml of methanol, and 0.02 mol of a tertiary amine(1,8-diazabicyclo[5,4,0]-7-undecene (DBU) or 1,4-diazabicyclo-[2,2,2]octane (DABCO) was added dropwise thereto. Thereafter, methanol was removed under vacuum, thereby obtaining a catalyst. Incidentally, the reagents used are those available from Nacalai Tesque, Inc. except for perfluorosuberic acid. Further, the pKa of DBU is 12.5, and the pKa of DABCO is 8.8. Oxalic acid, adipic acid, perfluorosuberic acid, DBU and DABCO were used in amounts so as to give mixing ratios shown in Table 1.

Alternatively, diphenylguanidine ("Accel D" manufactured by Kawaguchi Chemical Industry Co., Ltd.), DBU (manufactured by Nacalai Tesque, Inc.) and a DBU-formic acid mixture ("U-CAT SA603" manufactured by SAN-APRO Ltd.) were used as catalysts.

Then, kneading was performed by an open roll at a blending ratio so as to result in 1 part by mass of the catalyst per 100 parts by mass of FFKM to obtain a perfluoroelastomer composition. The resulting perfluoroelastomer compositions were examined for the following crosslinking characteristics and processability.

Crosslinking Characteristics

In accordance with JIS K6300-2, examination was made using a Monsanto Moving Die Rheometer (MDR) Model 2000 under the following conditions:

(Test Conditions)

Oscillation amplitude number: ±0.5°

Test temperature: 190° C.

Test time: 1 hour

Sample size: 38 mm disc (sample charge amount: 10 g)

(Measurement Items)

$M_L$ (dN·m): minimum torque $M_H$ (dN·m): maximum torque $T_c10$ (min): time required until the torque reaches $M_L + 0.1 \times (M_H - M_L)$ Processability (Roll Kneading Property)

When FFKM and the catalyst were kneaded by the open roll, the case where they could be normally kneaded was evaluated as "A", and the case where the scorch occurred to fail to knead them was evaluated as "C".

(Moldability)

The perfluoroelastomer composition kneaded by the open roll was filled in a mold for an O-ring (AS568-380), and heat pressed at 190° C. for 30 minutes. Thereafter, the appearance thereof was visually evaluated. The case where it could be normally molded was evaluated as "A", the case where the scorch partially occurred was evaluated as "B", and the case where foam formation and the like occurred to fail to normally form it was evaluated as "C".

The results thereof are shown in Table 1. In Examples using the catalyst obtained by mixing the organic dicarboxylic acid at a ratio of 0.4 to 2 mol per mol of the tertiary amine according to the invention, $T_c10$ is prolonged even compared with that in Comparative Example 3 using diphenylguanidine. This reveals that crosslinking in kneading can be prevented. In the evaluation of the processability, both the roll kneading property and the moldability in Examples were good. However, in Comparative Example 3, the roll kneading could be performed, but in regard to moldability the scorch partially occurred. Further, as shown in Examples 1 to 3, the crosslinking rate varies depending on the mixing ratio of the tertiary amine and the organic dicarboxylic acid. This reveals that changes in the crosslinking conditions can be complied with by the mixing ratio of the tertiary amine and the organic dicarboxylic acid.

Compared with the above, in all of Comparative Example 1 in which the blending ratio of the organic dicarboxylic acid was as too low as 0.3 mol, Comparative Example 4 using only DBU and Comparative Example 5 using the monocarboxylic acid, the kneading could not be performed, and $T_c10$ could not be measured. In Comparative Example 2 in which the blending ratio of the organic dicarboxylic acid was as too high as 3 mol, $T_c(10)$ could not be measured because the torque did not elevate. In the evaluation of the processability, the kneading could be performed, but the molding could not be performed.

TABLE 1

| | | Tertiary Amine:Organic Dicarboxylic Acid Molar Ratio | Tertiary Amine pKa | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 |
|---|---|---|---|---|---|---|---|---|---|---|---|---|---|---|
| | | | | | | | | | FFKM | | | | | |
| | | | | 100 | 100 | 100 | 100 | 100 | 100 | 100 | 100 | 100 | 100 | 100 |
| (1) | DBU-Oxalic Acid | 1:1 | 12.5 | 1 | | | | | | | | | | |
| (2) | DBU-Oxalic Acid | 1:0.7 | 12.5 | | 1 | | | | | | | | | |
| (3) | DBU-Oxalic Acid | 1:1.5 | 12.5 | | | 1 | | | | | | | | |
| (4) | DBU-Oxalic Acid | 1:0.3 | 12.5 | | | | | | | 1 | | | | |
| (5) | DBU-Oxalic Acid | 1:3 | 12.5 | | | | | | | | 1 | | | |
| (6) | DABCO-Oxalic Acid | 1:1 | 8.8 | | | | 1 | | | | | | | |
| (7) | DBU-Adipic Acid | 1:1 | 12.5 | | | | | 1 | | | | | | |
| (8) | DBU-Perfluorosuberic Acid | 1:1 | 12.5 | | | | | | 1 | | | | | |
| (9) | Diphenylguanidine* | | | | | | | | | | | 1 | | |
| (10) | DBU | | 12.5 | | | | | | | | | | 1 | |
| (11) | DBU-Formic Acid | | 12.5 | | | | | | | | | | | 1 |
| Crosslinking Characteristics | $M_H$ [dN·m] | | | 8.48 | 8.32 | 8.00 | 2.00 | 5.13 | 8.73 | — | 0.50 | 6.86 | — | — |
| | $T_c10$ [min] | | | 3.92 | 1.21 | 5.65 | 12.00 | 5.96 | 2.85 | — | — | 0.68 | — | — |
| Processability | Roll Kneading Property | | | A | A | A | A | A | A | C | A | A | C | C |
| | Moldability | | | A | A | A | A | A | A | C | C | B | C | C |

*Guanidine-based

While the present invention has been described in detail and with reference to specific embodiments thereof, it will be apparent to one skilled in the art that various changes and modifications can be made therein without departing from the spirit and scope thereof.

This application is based on Japanese Patent Application No. 2008-047521 filed on Feb. 28, 2008, and the contents thereof are herein incorporated by reference.

What is claimed is:

1. A perfluoroelastomer composition comprising:
    a perfluoroelastomer having a nitrogen-containing curing site; and
    a catalyst mixture comprising:
        a tertiary amine; and
        an organic dicarboxylic acid represented by general formula (1) or (2) in an amount of 0.4 to 2 mol per mol of the tertiary amine:

        HOOC—COOH     (1)

        HOOC-A-COOH     (2)

wherein A in formula (2) is an alkyl group having 1 to 10 carbon atoms or a phenyl group, which may be partially or fully fluorinated.

2. A perfluoroelastomer composition comprising:
    a perfluoroelastomer having a nitrogen-containing curing site; and
    a catalyst mixture comprising:
        a tertiary amine having a pKa of 9.0 or more; and
        an organic dicarboxylic acid represented by general formula (1) or (2) in an amount of 0.4 to 2 mol per mol of the tertiary amine:

        HOOC—COOH     (1)

        HOOC-A-COOH     (2)

wherein A in formula (2) is an alkyl group having 1 to 10 carbon atoms or a phenyl group, which may be partially or fully fluorinated.

* * * * *